(No Model.)
J. W. MICHAEL.
ROLLER.
No. 576,136. Patented Feb. 2, 1897.
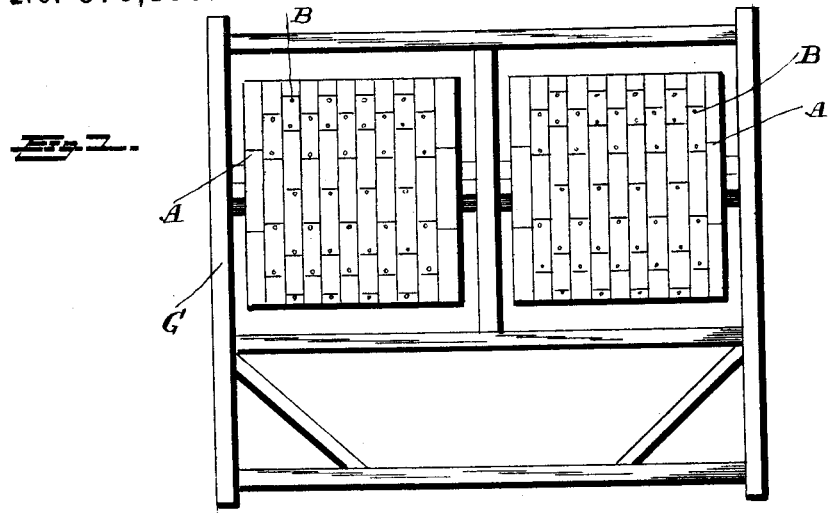
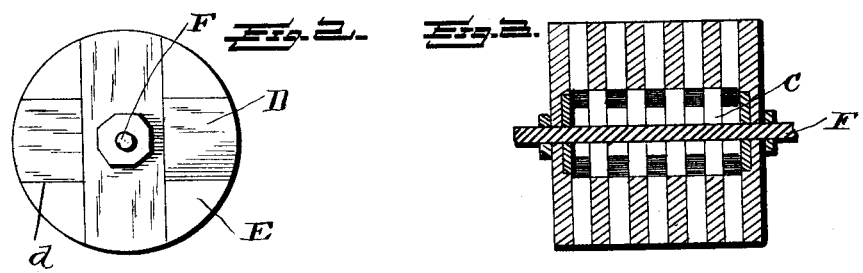
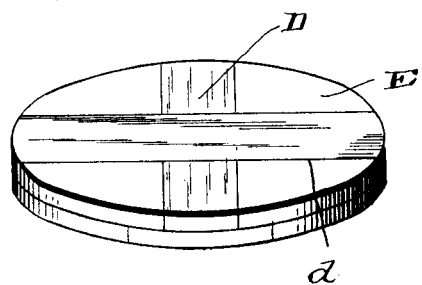
Witnesses
Inventor
John W. Michael
By John Wedderburn
his Attorney.

UNITED STATES PATENT OFFICE.

JOHN W. MICHAEL, OF ROCKVILLE, INDIANA.

ROLLER.

SPECIFICATION forming part of Letters Patent No. 576,136, dated February 2, 1897.

Application filed March 27, 1896. Serial No. 585,128. (No model.)

*To all whom it may concern:*

Be it known that I, JOHN W. MICHAEL, a citizen of the United States, residing at Rockville, in the county of Parke and State of Indiana, have invented certain new and useful Improvements in Rollers; and I do hereby declare the following to be a full, clear, and exact description of the invention, such as will enable others skilled in the art to which it appertains to make and use the same.

This invention relates to certain new and useful improvements in field-rollers; and it has for its objects, among others, to provide a simple, cheap, and durable roller composed of sections or series of boards or planks and mounted loosely upon its shaft, whereby little power is required for dragging the same and the ground or growing crop can be easily rolled.

Other objects and advantages of the invention will hereinafter appear, and the novel features thereof will be particularly pointed out in the appended claims.

The invention is clearly illustrated in the accompanying drawings, which, with the letters of reference marked thereon, form a part of this specification, and in which—

Figure 1 is a plan of my improved roller complete. Fig. 2 is an end view of one of the rollers removed. Fig. 3 is a section through the same. Fig. 4 is a perspective view of one of the end plates and one of the layers or rings of the roller.

Like letters of reference indicate like parts in the several views.

In constructing my roller I take a plurality of pieces A of board or plank of suitable thickness and arranged, say, preferably, six in number, with their curved sides outermost and their inclined faces adjacent to each other, so as to form the circular band or ring, the pieces or sections being secured together in any suitable manner, as by nails or bolts B, which pass from the outer curved side of one into the adjacent inclined side of the other. This leaves a large opening C at the center, as shown. As many of these rings as are necessary to form the desired length of roller are placed side by side, and then upon each outermost ring is placed the cross-shaped piece D, which is formed by two pieces placed at right angles to each other and halved together, and then into the angular spaces $d$ formed thereby are placed the angular pieces E, the outer faces of which are rounded, as shown. The end pieces D and the corner-pieces E are then secured by nails or otherwise to the rings and the whole held securely together. In arranging the different rings they are placed together so as to form lap-joints, as seen in Fig. 1, whereby a stronger and better roller is provided and with less danger of injury thereto by moisture.

In practice one, two, or more of the rollers are mounted upon the shaft F, which is held in suitable bearings in the end pieces, the intermediate rings being loose from the shaft, and the shaft is mounted in suitable bearings in the longitudinal portions of the frame G, as shown, the shaft being held fixed and the roller mounted to revolve loosely thereon. Suitable appliances are provided whereby the device as a whole may be turned over the ground.

The advantages of a roller constructed in accordance with my invention will be apparent. I utilize small waste pieces and construct a light, cheap, yet durable, roller, which, revolving loosely upon its shaft, is more easily operated and better results obtained.

If desired, a gudgeon may be fastened on the outer end of the roller and may be made of cast-iron, with flanges to be fastened on with bolts or screws when a solid roller is employed.

Having thus described the invention, what is claimed as new is—

1. A roller for the purpose described composed of a plurality of sectional rings, and end pieces upon the outer sides thereof and secured to and binding the rings in position, the sections of the rings being arranged to break joints, substantially as described.

2. A roller for the purpose described composed of a plurality of sectional rings, and end pieces upon the outer sides thereof and secured to and binding the rings in position, the sections of the rings being arranged to break joints, and corner-blocks filling the spaces at the angles of the end pieces and secured to the rings, substantially as described.

In testimony whereof I have signed this specification in the presence of two subscribing witnesses.

JOHN W. MICHAEL.

Witnesses:
DEMPSEY C. SEYBOLD,
GEORGE W. BELL.